(12) United States Patent
Lerner

(10) Patent No.: US 7,470,022 B2
(45) Date of Patent: *Dec. 30, 2008

(54) CAP ATTACHABLE, ADJUSTABLE SUNGLASSES

(76) Inventor: Bruce Lerner, 10709 S. Kilbourn, Oak Lawn, IL (US) 60453

( * ) Notice: Subject to any disclaimer, the term of this patent is extended or adjusted under 35 U.S.C. 154(b) by 0 days.

This patent is subject to a terminal disclaimer.

(21) Appl. No.: 11/825,959

(22) Filed: Jul. 10, 2007

(65) Prior Publication Data

US 2008/0024715 A1   Jan. 31, 2008

(51) Int. Cl.
*G02C 5/22*   (2006.01)
(52) U.S. Cl. ............... 351/155; 351/158; 2/209.13
(58) Field of Classification Search .......... 351/155, 351/158, 41, 111; 2/12, 10, 435, 13, 209.13
See application file for complete search history.

(56) References Cited

U.S. PATENT DOCUMENTS

| | | |
|---|---|---|
| 2,717,385 A | 9/1955 | Linster |
| 2,766,657 A | 10/1956 | Nathan |
| 3,988,058 A | 10/1976 | Chaney et al. |
| 4,349,246 A | 9/1982 | Binner |
| 4,577,347 A | 3/1986 | Connon |
| 4,869,586 A | 9/1989 | Chung |
| 5,009,496 A | 4/1991 | Holtan, Jr. et al. |
| 5,412,812 A | 5/1995 | Gatchalian |
| 5,422,686 A | 6/1995 | Kelman et al. |
| 5,533,207 A | 7/1996 | Diaz |
| 5,692,234 A | 12/1997 | Yuen |
| 5,987,640 A | 11/1999 | Ryder |
| 6,247,205 B1 | 6/2001 | Damadian et al. |
| 6,275,992 B1 | 8/2001 | Bondy |
| D451,532 S | 12/2001 | Bondy |
| 6,595,635 B2 | 7/2003 | Schubert |
| 6,641,266 B1 | 11/2003 | Lazarus |
| 6,892,393 B1 * | 5/2005 | Provost et al. ............. 2/10 |
| 7,240,370 B2 * | 7/2007 | Lerner ....................... 2/10 |

OTHER PUBLICATIONS

Search Report of PCT/US05/24050.

* cited by examiner

*Primary Examiner*—Hung X Dang
(74) *Attorney, Agent, or Firm*—Olson & Cepuritis, Ltd.

(57) ABSTRACT

Glasses are provided having one temple which is clipped to a cap, preferably to the brim or visor of a cap. The temple is associated with at least one joint which permits the lens portions to be pivoted from a use position before a user's eyes to a storage position along the user's head over one ear.

16 Claims, 3 Drawing Sheets

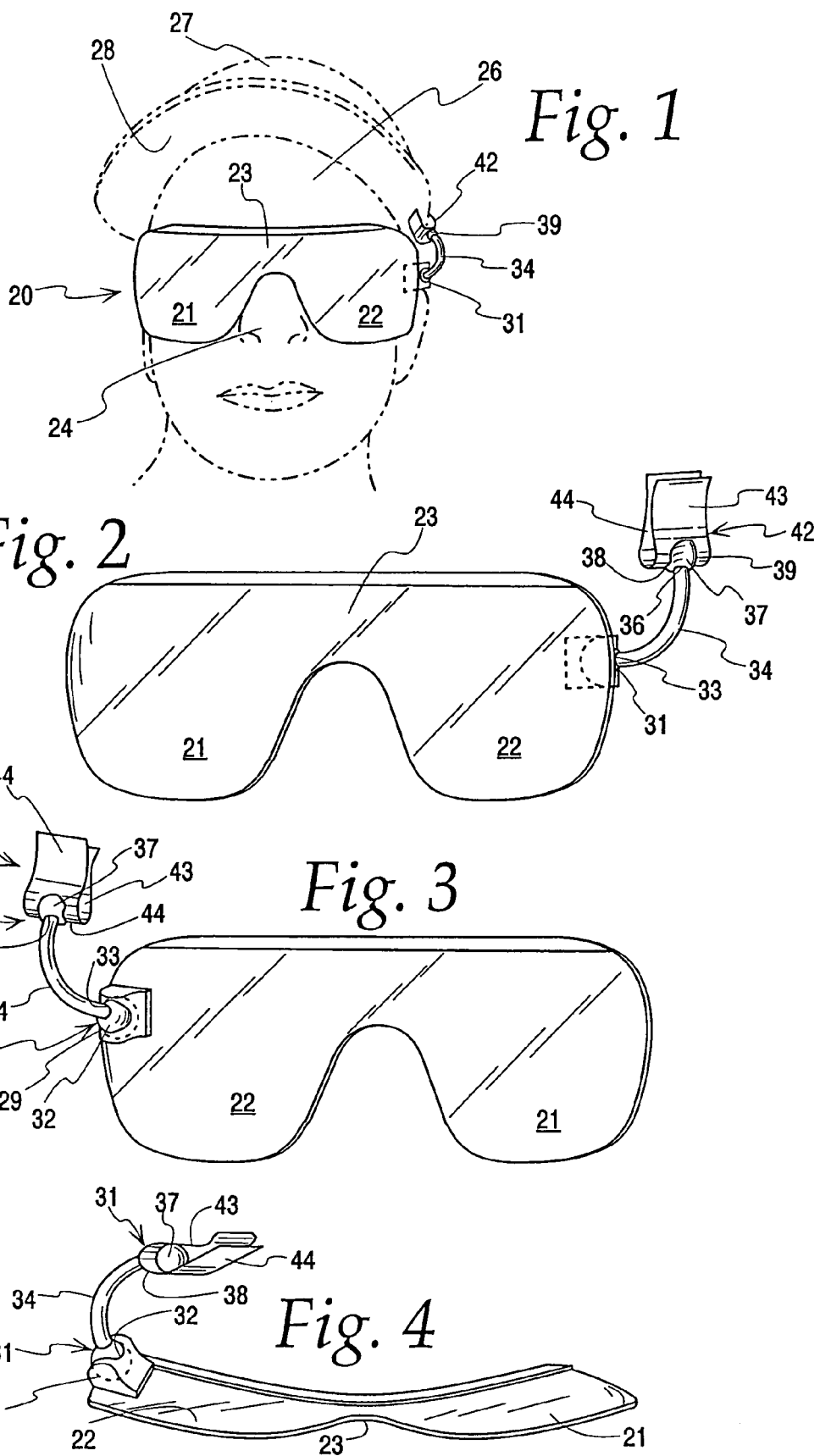

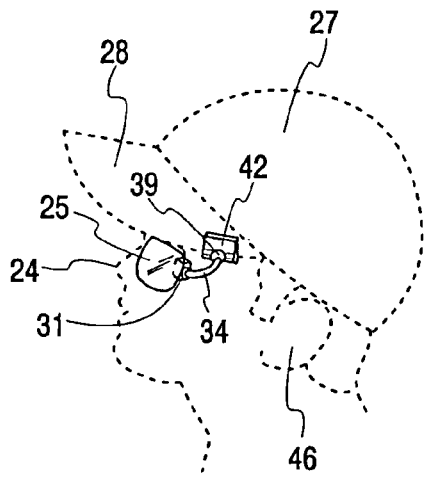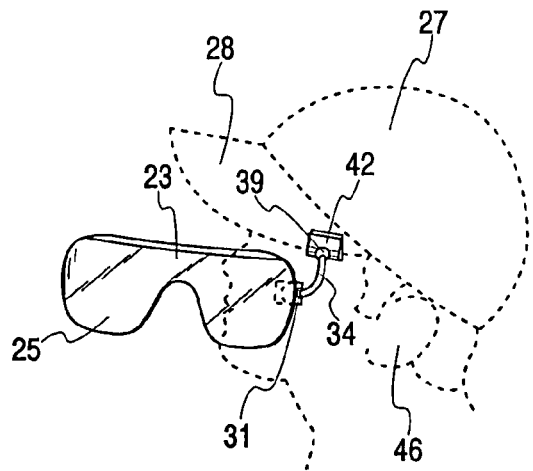
Fig. 5   Fig. 6
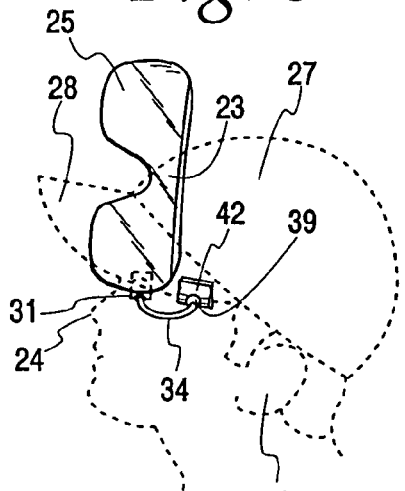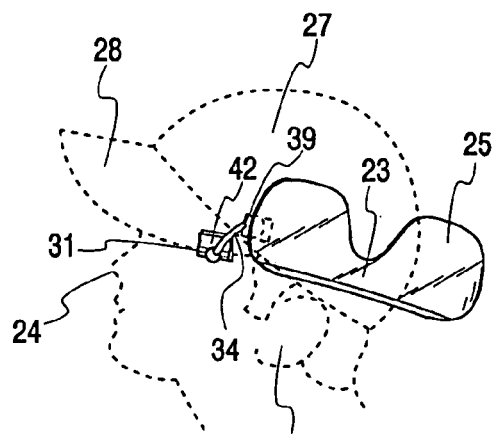
Fig. 7   Fig. 8
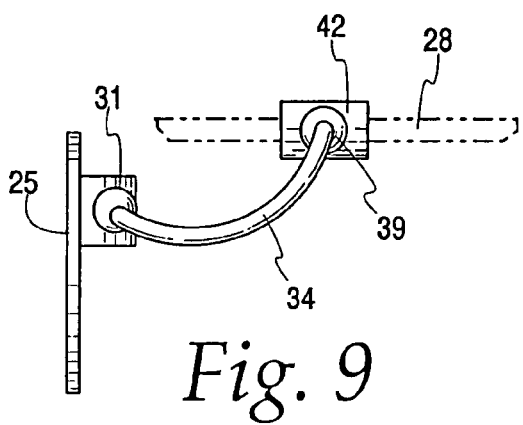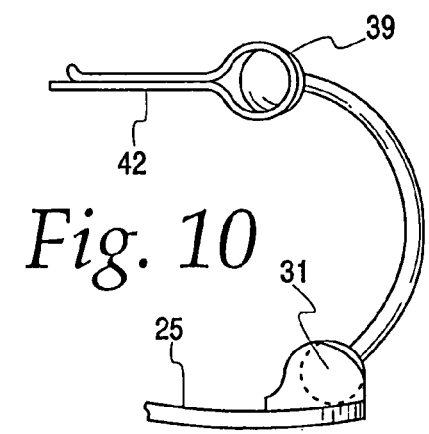
Fig. 9   Fig. 10

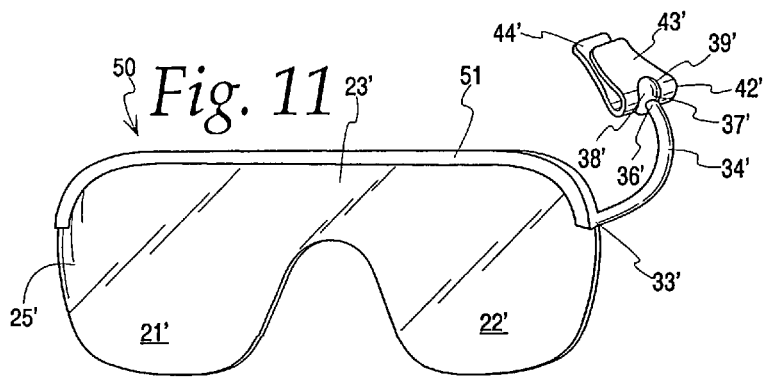
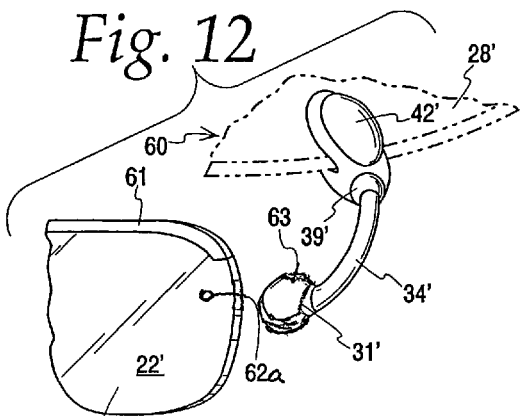
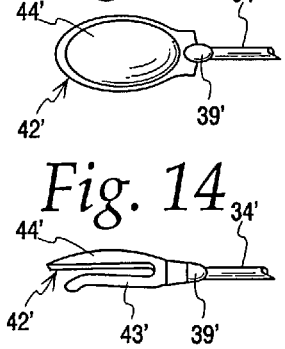
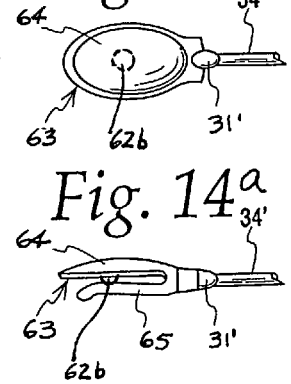
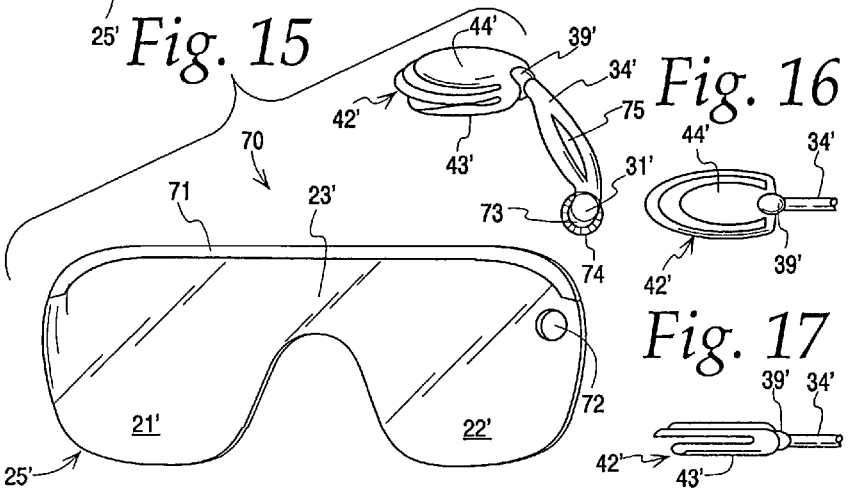

CAP ATTACHABLE, ADJUSTABLE SUNGLASSES

FIELD OF THE INVENTION

This invention relates to cap attachable, adjustable glasses, and more particularly to sunglasses with a temple that is cap attachable and that includes joint portions that permit the sunglasses to be moved from a use position to a storage position located over one ear of the user.

BACKGROUND OF THE INVENTION

Conventional sunglasses have tinted glass or plastic lens portions which, when in a use position before the wearer's eyes, are typically supported both medially by the ridge of the wearer's nose and also on opposite sides by the wearer's ears through a pair of so-called temples that each extend from a different side region of the lens portions to engage an ear.

Such conventional sunglasses suffer from various difficulties. For one thing, when in a use position before the wearer's eyes, the sunglasses can move or shift, for example, when the wearer perspires, so that the sunglasses slide downward on the wearer's nose.

For another thing, when not positioned over the wearer's eyes, the sunglasses must be removed, the temples folded inwards on hinge members for storage relative to the lens portions, and then deposited in a pocket, case or the like which operations typically require the use of both the wearer's hands, causing inconvenience and interruption or disruption of the wearer relative to another task at hand or in progress. When stored, sunglasses are placed in a use orientation, a reverse procedure must be used that likewise typically requires use of both the wearer's hands, and that likewise causes inconvenience, interruption or disruption of tasks in progress.

To avoid such problems, various efforts have previously been made to support the lens portions of sunglasses by a cap worn by the user. For example, Gatchalian U.S. Pat. No. 5,412,812 discloses the medial region of the lens portion pivotably supported by the brim or visor of a cap wearable by the user. For another example, Chung U.S. Pat. No. 4,869,586 discloses a bracket that interconnects a cap visor with an edge portion of a pair of sunglasses so that the sunglasses are pivotable either about a horizontal axis from a vertical use location to a horizontal storage location, or about a vertical axis from a vertical use location to a side storage location. However, with these assemblies, the sunglasses can seem to be unstable both when in a use location, and in a storage location. Also, these sunglasses can interfere with the user's visibility or maneuverability, thereby rendering these assemblies unsatisfactory and sometimes unsafe.

A new and improved sunglasses structure is needed which is cap supportable and which permits the lens portions to be located either in a use position or in a storage position where the lens portions are positioned so as to extend lengthwise along one side of the user's head.

SUMMARY OF THE INVENTION

Sunglasses are provided which include an adjustable temple structure. At one end region, the temple structure is provided with a bracket or clip structure that permits association with a cap portion, such as a cap visor, and at the opposite end region, the temple structure joins a lateral side edge region of the sunglasses.

The temple structure as attached to a cap permits the lens portions of the sunglasses to be positionable in a use position in front of the user's eyes and to be moved to a storage position located along one side of the user's head and over one ear. In the use position, the user's nose ridge can, if desired, be used for lens portion support.

To permit such movements and still maintain the sunglasses in a stable condition, both in the use position and in the storage position, the temple structure incorporates at least one and preferably two universal-type joints.

Preferably, the lens portions include a mid-region that is locatable over and is engageable with the user's nose ridge when the lens portions are in a use position.

The inventive glasses are relatively simple, reliable and convenient to use.

The inventive glasses are suitable for use in a wide variety of circumstances particularly including environments where sunglasses are desirable, for example, where the user is engaged in active physical activities, such as sports and recreational activities, construction activities or the like, and where the user is engaged in relatively passive physical activities, such as driving a vehicle, sunbathing or the like.

The inventive sunglasses are believed to overcome the foregoing disadvantages associated with conventional sunglasses.

Other and further objects, aims, features, objectives, purposes, embodiments and the like will be apparent to those skilled in the art from the following description, the associated drawings and the appended claims.

BRIEF DESCRIPTION OF THE DRAWINGS

In the drawings:

FIG. 1 is an environmental perspective view illustrating one embodiment of the cap attachable, adjustable glasses of the present invention, a user's head and the associated cap being shown in phantom;

FIG. 2 is a front elevational view of the glasses of FIG. 1;

FIG. 3 is a rear elevational view of the glasses of FIG. 1;

FIG. 4 is a top plan view of the glasses of FIG. 1 showing inside surface portions of the lens regions;

FIGS. 5-8 show side elevational views of FIG. 1 where, in progressive stages, the glasses of FIG. 1 are moved from a user use position as shown in FIGS. 1 and 5 to a user storage position as shown in FIG. 8 with the glasses remaining clipped to a cap being worn by the user, the user's head and associated cap being shown in phantom;

FIG. 9 is an end elevational view of FIG. 5 further illustrating an orientation of the glasses when in the use position, the cap brim being shown in phantom;

FIG. 10 is a side elevational view of the FIG. 4 embodiment;

FIG. 11 is a view similar to FIG. 2, but illustrating an alternative embodiment of the cap attachable, adjustable glasses of the present invention;

FIG. 12 is a view similar to FIG. 5 but illustrating fragmentarily another alternative embodiment of the cap attachable, adjustable glasses of the present invention, a user's head associated cap being shown in phantom;

FIG. 13 is a plan view of the cap brim-associatable clip employed in the embodiment of FIG. 12;

FIG. 13a is a plan view of the lens-associatable base employed in the embodiment of FIG. 12;

FIG. 14 is a side elevational view of the clip of FIG. 13;

FIG. 14a is a side elevational view of the base of FIG. 13a;

FIG. 15 is a view similar to FIG. 12 but illustrating in exploded form another alterative embodiment of the cap attachable, adjustable glasses of the present invention;

FIG. 16 is a plan view of the cap brim-associatable clip employed in the embodiment of FIG. 15; and FIG. 17 is a side elevational view of the clip of FIG. 16.

DETAILED DESCRIPTION

Referring to FIGS. 1-10, a preferred embodiment 20 of the inventive glasses is shown. The glasses 20 incorporate a pair of interconnected lens portions 21 and 22 which are tinted to provide sun screening capability. Alternatively, if desired, the lens portions can be clear or polarized. The lens portions 21 and 22, preferably and as shown, include a nose rest portion 23 located medially therebetween. Preferably, and as shown, the lower region of the nose rest portion 23 is configured for resting upon an upper region of the nose 24 of a user's head 26. The user's head 26 is wearing a cap 27 with a brim 28 when the glasses 20 are in a use position such as illustrated in FIGS. 1 and 5. In the use position, lens portion 21 is located before the right eye (not detailed) of the user 26 while the lens portion 22 is located before the left eye (not detailed) of the user 26. The lens portions 21 and 22 with the interconnecting nose rest portion 23 are generally conventional and are conveniently unitarily formed of plastic. For convenience, the combination of lens portion 21, lens portion 22 and nose rest portion 23 is designated by the numeral 25 herein. Alternative construction materials and alternative arrangements for the combination 25 can be used, if desired, as those skilled in the art will readily appreciate.

Mounted by heat sealing, adhesive or the like (not detailed) to the inside of the left edge region of the lens portion 22 is the integrally formed base and associated socket portion 29 of a second ball portion 37. The ball portion 37 is associated with a base and socket portion 38 so that the ball portion 37 and the base and socket portion 38 together comprise a ball and socket universal joint assembly 39. The base and socket portion 38 is unitarily formed and preferably defines also the neck region of a clip 42. The temple 34 extends outwardly from its second opposite end 36 that is associated with the base and socket portion 38.

The base and socket portion 38 is conveniently and preferably unitarily formed of molded plastic and is preferably somewhat transversely broadened. Preferably, opposite side regions of the base and socket portion 38 each have a unitarily formed, outwardly extending flattened leaf portion 43 and 44 with the leaf portions being generally adjacent to one another. However, if desired, the clip 42 and the base and socket portion 38 can each be separately formed and then associated with the temple 34 extending through a hole in the base and socket portion 38. Conveniently and preferably, clip 42 with leaf portions 43 and 44 is unitarily formed of a molded plastic.

Illustratively, the leaf 44 preferably has a planar configuration, and the leaf 43 has a resilient slightly arcuate configuration, when viewed in side elevation, though various configurations can be employed for the leaves 43 and 44. Preferably, an inherent spring bias or material memory associated particularly with leaf 43 that urges a portion of the leaf 43 into adjacent engagement with the leaf 44 is provided largely by the portion 38, thereby to permit the clip 42 to receive and to grasp between the leaves 43 and 44 a selected portion of the cap 27, preferably a portion of the brim 28, so as to support the glasses 20 when the clip 42 is engaged therewith and the cap 27 is positioned as desired on the head of a user 26.

Preferably, the frictional engagement between the ball portion 32 and the socket portion 29, and between the ball portion 37 and the socket portion 38 is such that, once a given position of the ball portion 32 or 37 relative to the socket portion 29 or 38, respectively, is selected by the hand(s) of the user 26, that position is retained so that the glasses 20 are maintained in a desired selected configuration, position or orientation.

In a preferred method of use of glasses 20, initially the clip 42 is engaged with a brim portion 28 of a cap 27 that is positionable on the head of a user 26 after an approximate use position for the combination 25 that includes lens portions 21 and 22 and the nose rest portion 23 before the eyes of the user 26 has been selected and the universal joints 31 and 39 have been adjusted accordingly. Usually, the clip 42 is conveniently associated with a side edge portion of the brim 28. When the combination 25 is in the use position such as illustrated in FIGS. 1 and 5, it is preferred to have the nose rest portion 23 rest upon the nose 24 with the combination 25 supported in the use position by the engaged clip 42 and by the nose rest portion 23, as those familiar with eyeglasses will readily appreciate.

To move and locate the associated combination 25 of lens portion 21, lens portion 22 and nose rest portion 23 in a storage position, such as illustrated in FIG. 8, from a use position, such as shown in FIG. 5, the universal joints 31 and 39 and temple 34 are reconfigured and adjusted by manually moving the combination 25 as illustrated in FIGS. 5-7 (the user's hand(s) upon the combination 25 not being shown for simplicity). Thus, with the cap 27 in place, the combination 25 is swung outwards and forwardly generally relative to the temple 34 from the use position illustrated in FIG. 5 to a forwardly oriented and extended position, such as illustrated in FIG. 6. From this position, the combination 25 is tilted upwardly, such as illustrated in FIG. 7, and then backwards generally relative to the temple 34 so that the combination 25 becomes located and longitudinally extended alongside the user's head and preferably rests mainly above the user's left ear 46. If desired, the region of the combination 25 that is over and adjacent to the ear 46 can rest thereon, such as illustrated in FIG. 8, during storage. During such movements, the temple 34 and the ball 32 appear to experience typically about 150° of movement relative to the ball 37, although the movement may be greater or smaller than this amount. Reversing the procedure enables movement of the combination 25 from the storage position to the use position.

The invention can be practiced with a wide variety of lenses, nose rest portions and the like. Various joint structures can be employed. An assembly of temple, joints and clip can be associated with either the left or the right side of a combination such as 25 or the like.

An alternative embodiment 50 of the inventive glasses is illustrated in FIG. 11. Components corresponding to those in embodiment 20 are similarly numbered but with the addition of prime marks for convenient identification purposes, and for convenience, the combination of lens portion 21', lens portion 22' and nose rest portion 23' is designated by the numeral 25' herein.

The combination 25' is provided with a partial frame 51 here illustratively comprised of molded plastic that extends over the upper border regions of the lens portion 21', the lens portion 22' and the nose rest portion 23'. The first opposite end 33' of the temple 34' is joined to one side edge (here, illustratively, the left edge relative to a user) portion of the edge of the frame 51 that is adjacent the left lens portion 22'. If desired, alternatively, the first opposite end 33' of the temple 34' could alternatively be joined to an opposite side edge of the frame 51 that is adjacent to the right lens portion 21', optionally achieved, for example, by dissociating partial frame 51 from the combination 25', turning the partial frame 51 end over end through 180°, and reassociating the partial frame 51 with the combination 25'.

The joining between frame 51 and end 33' of temple 34' is conveniently accomplished by unitarily molding the frame 51 with the temple 34', but other attachment procedures and means can be used, if desired. The temple 34' has a composition and curvature which may be similar to that of the temple 34. Here, the "take-off" angle of inclination of the temple 34' relative to the frame 51 at the opposite end 33' is about 120° relative to a (hypothetical) vertical line (not detailed) projected at the site of the opposite end 33' although smaller and larger angles can be used, if desired. Thus, embodiment 50 has no joint at the juncture of the opposite end 33' with the frame 51. Preferably, the temple 34' is comprised of a metal or plastic composition which is shape retaining but relatively easy to bend and configure by finger pressure exerted between coacting hands of a user.

While one end 33' of the temple 34' is joined to an end edge of the frame 51, the other end 36' of the temple 34' is associated with a ball portion 37' that is associated with a base and socket portion 38' so that the ball portion 37' and the base and socket portion 38' comprise a ball and socket universal joint assembly 39'. Thus, the second opposite end 36' of the temple 34' is associated with a ball and socket universal joint 39' corresponding to the joint 39 in embodiment 20. The universal joint 39' permits the combination 25' to be repositioned from a use position to a storage position and vice versa, corresponding to the combination 25 in embodiment 20.

An alternative embodiment 60 of the inventive glasses is fragmentarily illustrated in FIGS. 12-14. Components corresponding to those in embodiment 20 are similarly numbered but with the addition of prime marks thereto for convenient identification purposes, and for convenience, the combination (not fully shown) of lens portion 21', lens portion 22' and nose rest portion 23' is designated by the numeral 25' herein. The embodiment 60 can include a partial frame 61 that is permanently associated with the combination 25' (as shown) or the partial frame 61 can be omitted.

In embodiment 60, the clip 42' and the base 63 can include a substantially similar construction as shown in FIGS. 13, 13a, 14 and 14a. The lens portion 22' adjacent its left edge is provided with an aperture 62a that is adapted to receive thereinto matingly a corresponding raised portion or detent 62b of a base 63 of a ball and socket universal joint 31'.

The raised portion 62b can be formed on the inner surface of leaves 64 and/or 65 of the base 63 as shown in FIGS. 13a and 14a. The base 63 is slid over the lens portion 22' so that the raised portion 62b engages the aperture 62a. In this manner, the lens portion is removably secured to the base 63 and various lens portions can be conveniently substituted.

If desired, the opposite end portion (not detailed) of the combination 25' may have defined therein a similar aperture 62a, thereby enabling the subassembly of temple 34, clip 42' and base 63 alternatively but correspondingly to be associated with a right edge of the lens 21' (not detailed). If desired, the subassembly of temple 34, clip 42' and base 63 can be made and sold separately from the combination 25', thereby enabling a user to select a particular desired one subassembly from a plurality of subassemblies, or to select a particular desired one combination 25' from among a plurality of combinations 25' which perhaps could differ from each other in coloration, size, or the like. The elliptically profiled leaves 43' and 44' of the clip 42' are shown in FIGS. 13 and 14. Leaf 44' on its upper surface portions provides an area whereon a logo or the like may be impressed if desired.

An alternative embodiment 70 of the inventive glasses is fragmentarily illustrated in FIGS. 15-17. Components corresponding to those in embodiment 20 are similarly numbered but with the addition of prime marks thereto for convenient identification purposes, and, for convenience, the combination 25' (fragmentarily shown) of lens portion 21', lens portion 22' and nose rest portion 23' is designated. The embodiment 70 includes a partial frame 71 that is associated with the combination 25'.

In embodiment 70, the lens 22' adjacent to a portion of its left edge is provided with an aperture 72 that is adapted to receive therethrough matingly the projecting short stem portion of a base 73 of a ball and socket universal joint 31' (not detailed). The outer terminal portion of the stem portion is adapted to receive thereover a friction-associated retainer cap 74. Alternatively, the stem portion can be threaded and associated with a matingly engageable nut member (not shown) in place of the cap 74, if desired. If desired, the cap 74 can be adhesively bonded to adjacent portions of the stem portion. The elliptically profiled leaves 43' and 44' of the clip 42' are shown in FIGS. 13 and 14. Leaf 44' on its upper surface portions provides an area whereon a logo or the like may be impressed, if desired. The temple 34' in embodiment 70 has a flattened mid-region with a longitudinally extending slot 75' defined therein, a temple 34' configuration that offers a user an enhance surface area for manipulation purposes.

Numerous structural and functional modifications and adaptations may be achieved, as those of ordinary skill in the art will readily appreciate, without departing from the spirit and scope of the invention. For example, the lens portion 21 and/or 22 can comprise a magnifying lens. In another embodiment, a light, rather than (or in addition to) a lens portion, could be connected to the temple structure.

What is claimed is:

1. Cap attachable glasses comprising:
   a lens portion having opposed ends adjacent the temples of a user of said glasses;
   a temple structure for supporting said lens portion relative to a cap worn by a user of said glasses, said temple structure including a first end removably associated with one end of said lens portion, a second end including a universal joint, connectable with a portion of said cap adjacent the user's temple so as to support the lens portion with the cap for rotation in a substantially horizontal plane and subsequent pivoting in a substantially vertical plane, to move the lens portion from an upright position in front of the user's eyes to a storage position inverted from said upright position, adjacent one ear of said user; and
   wherein the first end of said temple structure includes a second universal joint.

2. The glasses of claim 1 wherein said movement occurs without movement of said cap.

3. The glasses of claim 1 wherein said second end includes a clip that is disengageably engageable with a brim portion of said cap.

4. The glasses of claim 1 wherein a portion of said temple structure is flexible.

5. The glasses of claim 1 wherein said lens portion includes a nose rest portion medial of the first and the second ends for resting said lens portion upon a portion of the nose of the user when said lens portion is in said use position.

6. The glasses of claim 1 wherein said lens portion is sun screening.

7. The glasses of claim 1 wherein said first end is directly connected to the one end of said lens portion.

8. Cap attachable glasses comprising:
a lens portion adapted for positioning in an upright position adjacent the eyes of a person, the lens portion having a pair of opposed side edge regions; and
a curved temple structure for supporting said lens portion in said use position, said temple structure comprising:
first and second opposite end portions;
said first end portion being removably connected to one end of said lens portion, with a first connection comprising a universal joint,
said second end portion being connectable to a cap wearable by said person, with a second connection for removably attaching said second end portion to a portion of said cap; and
the second connection comprising a universal joint at the second end portion for rotating and subsequently pivoting said lens portion from said upright position to a storage position inverted from said upright position, over one ear of the person.

9. The glasses of claim 8 wherein said lens portion is sun screening.

10. The glasses of claim 8 wherein said lens portion includes a nose rest portion medial of said side edge regions, for resting upon the nose of said person when said lens portion is in said use position.

11. The glasses of claim 8 wherein said second connection comprises a clip that is disengageably engageable with a brim portion of said cap.

12. Cap attachable glasses comprising:
a lens member including a pair of lens portions, each said lens portion having an edge region and being adapted for positioning in an upright position over an eye of a user of the glasses, said lens member further including a medially located nose rest;
when said pair of lens portions is in said upright position, said medially located nose rest rests over the nose bridge region of said user;
a curved temple structure having first and second opposite end portions, said first end portion being removably coupled with a first universal joint to one of said lens portions, said second end portion being connected with a second universal joint to a clip for attaching said second end portion to a portion of a cap wearable by said user; said first and second joints being adapted to rotate and subsequently pivot said pair of lens portions between said upright position and said storage position inverted from said upright position.

13. The glasses of claim 12 wherein said temple structure is arcuate.

14. The glasses of claim 12 wherein said pair of lens portions is comprised of plastic.

15. The glasses of claim 12 wherein lens portions and said nose rest are associated with a frame member.

16. The glasses of claim 15 wherein said first end portion is connected to an edge region of said frame member.

* * * * *